US011429399B2

(12) United States Patent
Vigil et al.

(10) Patent No.: US 11,429,399 B2
(45) Date of Patent: Aug. 30, 2022

(54) CONFIGURATION CONTAINER FOR CONTAINER ORCHESTRATION PLATFORM

(71) Applicant: Pivotal Software, Inc., Palo Alto, CA (US)

(72) Inventors: Jason Vigil, Denver, CO (US); Goutam Tadi, San Jose, CA (US); David Sharp, Mountain View, CA (US); Karen Huddleston, San Mateo, CA (US); Oz Basarir, San Francisco, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 304 days.

(21) Appl. No.: 16/896,052

(22) Filed: Jun. 8, 2020

(65) Prior Publication Data
US 2021/0382727 A1     Dec. 9, 2021

(51) Int. Cl.
*G06F 9/455* (2018.01)
*G06F 9/445* (2018.01)
(Continued)

(52) U.S. Cl.
CPC ...... *G06F 9/44505* (2013.01); *G06F 9/45533* (2013.01); *G06F 9/505* (2013.01);
(Continued)

(58) Field of Classification Search
CPC ............. G06F 9/44505; G06F 9/45533; G06F 9/5022; G06F 9/505; G06F 9/54; H04L 67/1097; H04L 67/34
(Continued)

(56) References Cited

U.S. PATENT DOCUMENTS

| 10,152,268 B1 * | 12/2018 | Chakraborty | ........... G06F 3/065 |
| 10,944,691 B1 * | 3/2021 | Raut | ........... H04L 45/64 |

(Continued)

FOREIGN PATENT DOCUMENTS

CN     109478134 A  *  3/2019   ............... G06F 8/60

OTHER PUBLICATIONS

English Translation of CN-109478134-A (Year: 2019).*

*Primary Examiner* — Bradley A Teets
(74) *Attorney, Agent, or Firm* — Fish & Richardson P.C.

(57) ABSTRACT

Methods, systems, and apparatus, including computer programs encoded on computer storage media, for implementing a configuration container that can store user configuration files. One of the methods includes receiving a request to launch a configuration container from a configuration container image. A configuration container is launched using the configuration container image and a persistent storage volume is attached to the configuration container. A plurality of user configuration files are copied into the persistent storage volume. A configuration file is received for launching a workload on a container orchestration platform, wherein the configuration file includes a reference to the configuration container. A request to launch the workload on the container orchestration platform using the configuration file is received. A plurality of containers are provisioned and the workload is launched using the plurality of containers. The plurality of user configuration files are copied from the configuration container.

20 Claims, 2 Drawing Sheets

(51) Int. Cl.
   *G06F 9/50*       (2006.01)
   *H04L 67/00*      (2022.01)
   *G06F 9/54*       (2006.01)
   *H04L 67/1097*    (2022.01)

(52) U.S. Cl.
   CPC .............. *G06F 9/5022* (2013.01); *G06F 9/54* (2013.01); *H04L 67/1097* (2013.01); *H04L 67/34* (2013.01)

(58) Field of Classification Search
   USPC .................................................. 713/1; 718/1
   See application file for complete search history.

(56) References Cited

U.S. PATENT DOCUMENTS

| | | | |
|---|---|---|---|
| 2011/0154101 A1* | 6/2011 | Merwe ................ | G06F 11/3006 718/1 |
| 2019/0065323 A1* | 2/2019 | Dhamdhere ........ | G06F 11/1484 |
| 2020/0034258 A1* | 1/2020 | Avraham ............ | G06F 11/2094 |
| 2020/0150974 A1* | 5/2020 | Li ....................... | G06F 9/45558 |
| 2020/0272712 A1* | 8/2020 | Pintér .................... | G06F 21/62 |

* cited by examiner

CONFIGURATION CONTAINER FOR CONTAINER ORCHESTRATION PLATFORM

BACKGROUND

This specification relates to cloud computing platforms, and more particularly to container orchestration platforms.

A cloud application platform is platform-as-a-service ("PaaS") cloud computing system that allows users to deploy and manage multiple instances of network-accessible applications, which for brevity will also be referred to as simply applications or, when additional context is required, platform applications. The applications are executed by hardware of an underlying cloud computing infrastructure, which may or may not be provided by a different entity, e.g., an entity providing an infrastructure-as-a-service ("IaaS") platform. The cloud application platform can handle provisioning of resources in the underlying cloud computing infrastructure as well as staging and launching of applications using the provisioned resources. Therefore, developers who use the cloud application platform need not spend time building or configuring the hardware of a cloud computing system. Rather, the developers can focus on the application development itself, and rely on the services provided by the cloud application platform to launch and manage instances of the application. After being launched, the application instances can be used by end users over a network, e.g., the Internet.

A container orchestration platform is a cloud computing platform that manages the lifecycles of containers. For example, Kubernetes is an open-source container orchestration system for automating application deployment, scaling and management. A container is a type of software that can virtually package and isolate applications for deployment. A container can provide operating system level virtualization, which is different from a virtual machine that can provide hardware level virtualization. A container orchestration platform can provide a platform for automating deployment, scaling and operations of application containers across clusters of hosts.

In a cloud computing system where containers are used, a user may need to start or restart stateless containers with a set of user configuration files. Existing container orchestration platforms may require the user to modify the container image of a launched container in order to perform configuration with a set of user configuration files. This requirement is undesirable because it may require the user to manually copy the user configuration file after the container has been started or launched. Alternatively, existing container orchestration platforms may require adding persistent volumes to the application containers, which makes the applications containers heavier and stateful. For example, some IaaS platforms may require a minimum persistent storage volume size that is beyond what is needed for configuration data and files. As another example, ConfigMaps in Kubernetes may not be able to store large files. These requirements can unnecessarily increase the cost of storage and can require management of more storage volumes. Additionally, the user configuration files may need to be updated by the user frequently and may need to be shared among different application containers among different computer pods. Existing container orchestration platforms do not have a storage mechanism optimized for updates from users or for sharing among computer pods.

Therefore, there are no established methods to create a curated stack of application containers in a container orchestration platform by serving each application container with the set of user configuration files of large or small size. Existing methods resort to modifying container images or adding persistent volumes, both of which are methods with their shortcomings.

SUMMARY

This specification describes a container orchestration platform having a configuration container that can store user configuration files. The container orchestration platform can create application containers with arbitrarily large user configuration files stored in the configuration container.

Particular embodiments of the subject matter described in this specification can be implemented so as to realize one or more of the following advantages. A container orchestration platform can automatically use configuration containers with persistent storage volume to store user data and user configuration files without restricting a minimum or maximum size limitation. Users do not have to manually copy data and files after the stateless containers have been started. Any number of containers can use the same configuration containers. Large and small user configuration files that are not appropriate for other existing methods can be handled using the configuration container. Application containers that only need such user configuration data and files during initialization can remain stateless without the need to use persistent storage volumes.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
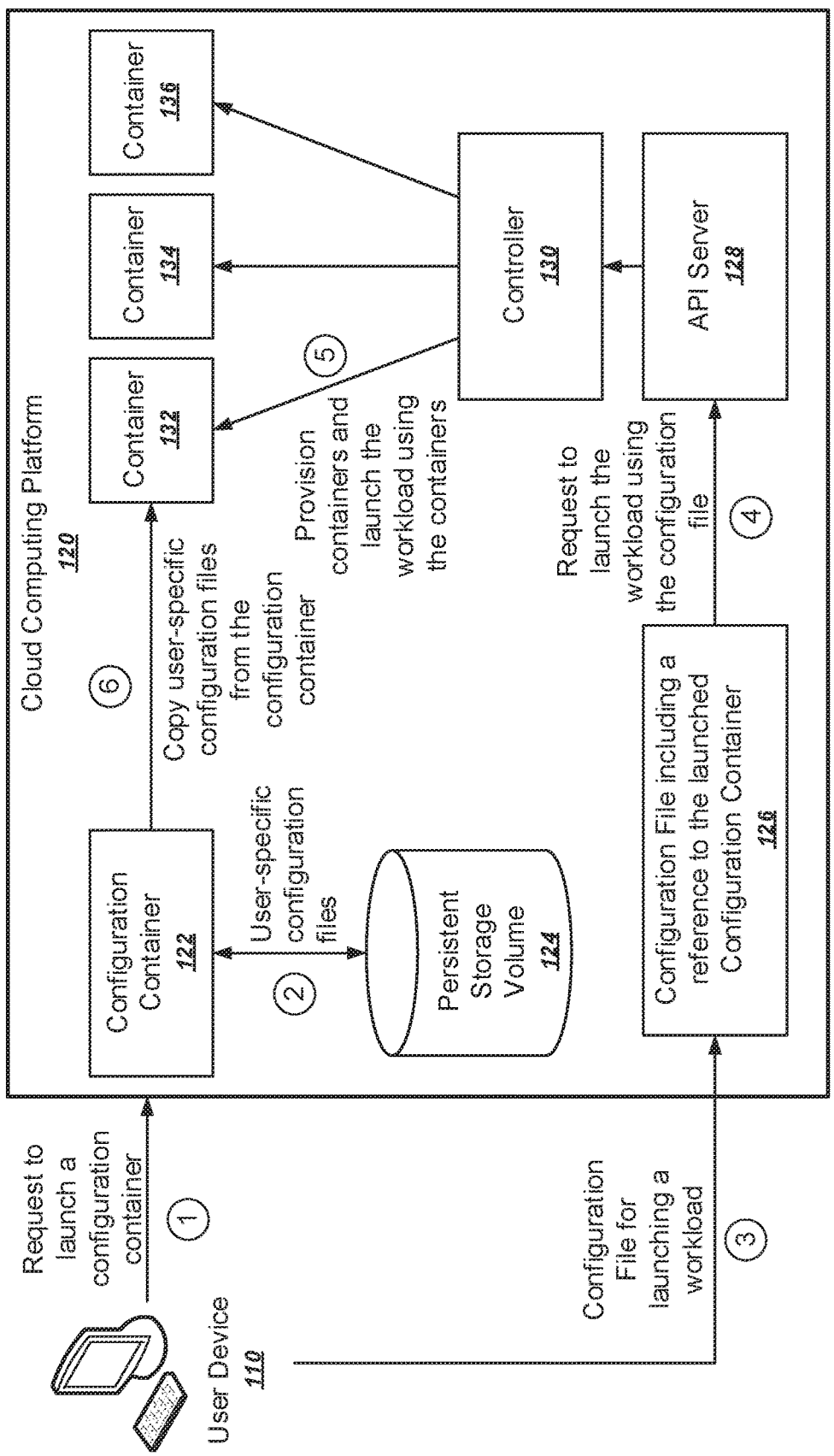
FIG. 1 is a diagram of an example system having a configuration container in a cloud computing platform.

FIG. 1 is a diagram of an example system 100 having a configuration container 122 in a cloud computing platform 120. In a cloud computing environment where containers are used, the system 100 can start or restart containers with a set of user-specific configuration files. For example, based on a request to launch a workload on a cloud computing platform 120 from a user device 110, the system 100 can use user-specific configuration files stored in the configuration container 122 to perform configuration for a plurality of containers 132, 134, 136 that are provisioned and launched for the workload requested by a user device 110.

The user device 110 can be a computing device, e.g., a laptop, a desktop or a mobile device etc., connected to the cloud computing platform 120 over a wired or wireless network. At a preparation stage, the user device 110 can request the cloud computing platform 120 to launch a configuration container 122 from a configuration container image provided by the user device 110. Later, the user device 110 can request the cloud computing platform 120 to launch a workload using a configuration file that includes a reference to the launched configuration container 122.

A configuration container 122 is a container that can store a plurality of user-specific configuration files that are specific for a particular user of the user device 110. In this specification, a container is a software-implemented isolated user computing space that implements operating-system level virtualization. Containers share computing resources, e.g., memory or processing power, of the respective computing systems that host the containers. Computing systems can dynamically adjust computing resource allocations between containers. Containers can be distinguished from virtual machines in that virtual machines typically provide only hardware virtualization.

The user-specific configuration files can include a number of different types of configuration files. For example, the user-specific configuration files can include one or more file transfer protocols, e.g., a protocol for copy operations. As another example, the user-specific configuration files can include one or more database configuration files and one or more network configuration files, to name just a few examples.

The configuration container 122 can store the plurality of user-specific configuration files on a persistent storage volume 124 attached to the configuration container 122. At the preparation stage, based on a request from the user device 110, the system can launch the configuration container 122 using a configuration container image and attach a persistent storage volume to the configuration container 122. The user-specific configuration files are copied to a persistent storage volume 124.

When launching a container for the user device 110, the system can copy the user-specific configuration files corresponding to the user device 110 and stored in the configuration container 122 to a plurality of containers provisioned on the cloud computing platform. The configuration container 122 allows the system 100 to start or restart containers with these user-specific configuration files. By using the configuration container, the system can have the advantage of launching workloads in a container environment with the same set of user-specific configuration files. In this way, the system can serve each application with the set of user configuration files of large or small size, without resorting to modifying images of the containers or adding persistent volumes. Using the configuration container with a persistent storage volume, application containers that only need such user-specific configuration files during launching can remain stateless rather than the application containers being tied to persistent storage volumes.

For example, a user device can request launching a workload that includes a massively parallel database application. The launching of the database application can involve many resources, such as services, Customer Resource Definitions (CRDs), and containers. These resources have different roles and responsibilities in the database application, such as storing and processing user data on the containers that have different roles and identities. In addition, the database application can involve components that can reach outside the database application and into public cloud systems. For example, text analytics components can reach into public clouds and pull or push data from public data sources. Therefore, a whole ecosystem of container resources may need to be created when launching the massively parallel database application. Some of the containers require information about the specific customer or user needs. These user-specific configurations can be stored in the configuration container 122 and can be pulled from the configuration container 122 into a plurality of stateless containers 132, 134 and 136 launched for the database application. Because the user-specific configuration files have been stored on the configuration container 122 with a persistent storage volume 124, the plurality of stateless containers do not need persistent data beyond their life span.

The user-specific configuration files are files used to perform container configuration for one or more containers launched for a workload. The user-specific configuration files can include configuration values of configuration items that a launched container may need to know in the operating environment of the cloud computing platform. The user-specific configuration files can include an arbitrary number of configuration items, without having a limitation on the size of each user-specific configuration file.

For example, the user-specific configuration files can include JAR files and architecture files. As another example, the user-specific configuration files can include information associated with an endpoint URL, an access key value, an upload speed configuration value, an access style configuration value, etc. By using this information, a launched container can use configuration values of arbitrary number of configuration items to perform configuration that is associated with the operating environment.

As another example, the user-specific configuration files can include shared objects containing software plugins for an extensible behavior of the software running in the container. Although the software plugins may have large file sizes, the system that uses the configuration container can use user-specific configuration files to include shared objects containing these software plugins. This is an additional capability that other systems cannot support due to the large file sizes of the software plugins. As described above, the configuration container can store configuration files having arbitrarily large file sizes. Thus, for example, a JAR file can be larger than 1, 10, or 100 MB in size. In general, the user configuration files are provided by the user device to a container after the container has been launched in order to initialize the container. This allows users to highly customize their containers without modifying container images. Additionally, these techniques allow the system to share the same user-specific configuration files across many different containers requested by the same user device.

The system can attach a persistent storage volume 124 to the configuration container 122. The persistent storage volume 124 can be a storage volume that does not change content upon the start or restart of provisioned containers for a workload. At the preparation stage, the system can copy a plurality of user-specific configuration files into the persistent storage volume 124. The user-specific configuration files stored on the persistent storage volume 124 can be a variety of sizes and can be stored in any appropriate format, e.g., plain text or binary.

A configuration file 126 includes a list of configuration parameters for launching a workload. For example, a configuration file for launching a database workload, e.g., a Greenplum Instance yaml configuration file can contain parameters for launching the database workload, e.g., configuration parameters for the necessary components of Greenplum Workbench that manages a Greenplum database, configuration parameters for GPText that enables processing mass quantities of raw text data, and configuration parameters for Greenplum Platform Extension Framework (PXF) that provides parallel high throughput data access and federated queries across heterogeneous data sources, etc.

The configuration file 126 can be received at the cloud computing platform 120, from the user device 110, for launching a workload on the cloud computing platform 120. The configuration file 126 contains the necessary configuration information in order to launch the workload. In particular, the configuration file 126 can include a reference to the launched configuration container 122. For example, the reference be an IP address of the configuration container, a name of the configuration container in a particular container namespace, a DNS name referring to the IP address of the configuration container, a URL, an endpoint address, an access key, or a secret key, etc. After receiving these necessary configuration information, the system can locate the launched configuration container using the URL or DNS name, and get access to user-specific configuration files stored in the launched configuration container using the access key or secret key. The system can later use the user-specific configuration files included in the launched configuration container to configure the one or more containers. For example, the configuration file can be a yaml configuration file that has a reference to the configuration container to launch a Greenplum instance.

An application programming interface (API) server 128 is a container-orchestration server for automating application deployment, scaling, and management. For example, the API server 128 can be a Kubernetes API server. The API server 128 can receive the request to launch the workload using the configuration file 126. Then the API server 128 can forward the request to a controller 130 which can provision resources and launch the workload. For example, the Kubernetes API server can receive a Greenplum Instance yaml configuration file for launching a workload and can forward the yaml configuration file to a Greenplum Operator which is the controller 130 to launch a number of containers 132, 134 and 136 for the workload.

The controller 130 is a master node in a container orchestration platform programmed to keep a predetermined number of containers alive for a workload. In some implementations, when one of the provisioned containers dies, the controller 130 can provision a new container for the workload. For example, the controller can be a Greenplum Operator, which is a master node that keeps the provisioned containers alive and can make sure there are always a certain number of containers available for a workload. When one of the three containers 132, 134 and 136 is not available or is not functioning properly, the Greenplum Operator can provision a new container for the workload.

The controller 130 can receive the request to launch a workload from the API server 128. The request can include a configuration file 126 including a reference to the launched configuration container 122. Then the controller can provision a plurality of containers 132, 134 and 136, and launch the workload using the plurality of containers based on the received configuration file 126. For example, the Greenplum Instance yaml configuration file may indicate that a workload needs three containers. Then a Greenplum Operator can provision three containers for the workload and launch the workload using the three containers.

A plurality of containers 132, 134 and 136 are stateless containers and can be initialized with data and files from user device 110. These containers refer to isolated userspace instances that can be implemented by operating-system-level virtualization. These containers can share computing resources, e.g., memory or processing power, of the respective computing system that hosts the containers. Computing system can dynamically adjust resource allocation between containers as necessary.

During container initialization, i.e., upon start or restart of a container requested by the specific user device, each of the plurality of containers can automatically copy the user-specific configuration files from the configuration container 122 launched on the cloud computing platform 120. Each container can automatically obtain a copy of the user-specific configuration files stored in the persistent storage volume 124 attached to the configuration container 122. The plurality of containers launched by the same user device can share the same user-specific configuration files.

A user does not need to manually copy user-specific configuration files after the stateless containers 132, 134, and 136 have been started. Any arbitrary number of containers can use the same configuration container 122 to obtain the user-specific configuration files. In addition, the size of the user-specific configuration files can accommodate large configuration files, for example, those that are used by ConfigMaps in Kubernetes. Other examples of large configuration files that are not appropriate for other methods can be handled using the configuration container 122. Containers that only need such user-specific configuration files at initialization time can remain stateless rather than having to use persistent storage volumes to store the user-specific configuration files. This makes the containers lightweight and stateless. Referring to FIG. 1, during step (1), a user device 110 of the cloud computing platform sends, to a cloud computing platform 120, a request to launch a configuration container 122 from a configuration container image.

During step (2), the system launches a configuration container 122 using the configuration container image and attaches a persistent storage volume 124 to the configuration container 122. The system then copies a plurality of user-specific configuration files into the persistent storage volume 124 attached to the configuration container 122.

For example, the user-specific configuration files can include a directory for an external data server that a container needs to connect to. The external data server can be Hadoop data, S3 data, or Oracle data. The access information for the external server is provided in a jar file for Java Database Connectivity (JDBC) connection. Sometimes, the jar file cannot be built into a container image because the file size of the jar file is larger than a size limit because of the etcd limit in Kubernetes. The jar file can be stored in the Configuration container 122, and containers 132, 134 and 136 launched by a user device can later get a copy of the jar file from the configuration container 122.

The configuration container 122 is set up for future usage by the specific user device 110. In some implementations, multiple user devices can also share a configuration container 122 when the multiple user devices share the same user-specific configuration files.

In some implementations, the configuration container 122 may have a number of copies or replicas. These copies or replicas can ensure High Availability (HA) for system up-time, and can help handle data distribution problems and protection problems. The configuration container 122 can be accessed via a proxy server or a service.

During step (3), the user device 110 sends a configuration file for launching a workload on the cloud computing platform 120. The configuration file can include a reference to the launched configuration container 122.

During step (4), the user device sends a request to launch a workload on the cloud computing platform 120 using the configuration file. The API server 128 receives the request and forwards the request to a controller 130.

During step (5), the controller 130 provisions a plurality of containers 132, 134 and 136, and launches the workload using the plurality of containers. These containers are target stateless containers that need to be initialized after launch. These containers can be a group of containers that are deployed together on the same host. Alternatively, these containers can be deployed on different hosts.

During step (6), the system can copy the user-specific configuration files stored in the persistent storage volume 124 that is attached to the configuration container 122 to the target stateless container. As discussed in a previous example, after a container 132 is launched, a JAR file that has the access information for an external data server can be copied to the container 132. Then the container 132 can obtain the access information for the server and can query the external data server that is outside the workload application.

In some implementations, a mediator software application can help with the copying operation between the configuration container 122 and the target stateless container(s). The mediator software application can be programmed to pull data from the configuration container 122 and to push data to the target stateless containers. The configuration container and the target stateless containers no longer communicate directly with each other, but instead communicate through the mediator software application. This reduces the dependencies between the configuration container and the target stateless containers.

In some implementations, when a container for the workload restarts, the system can also automatically copy the user-specific configuration files from the configuration container 122 to the restarted container.

Figure 2:
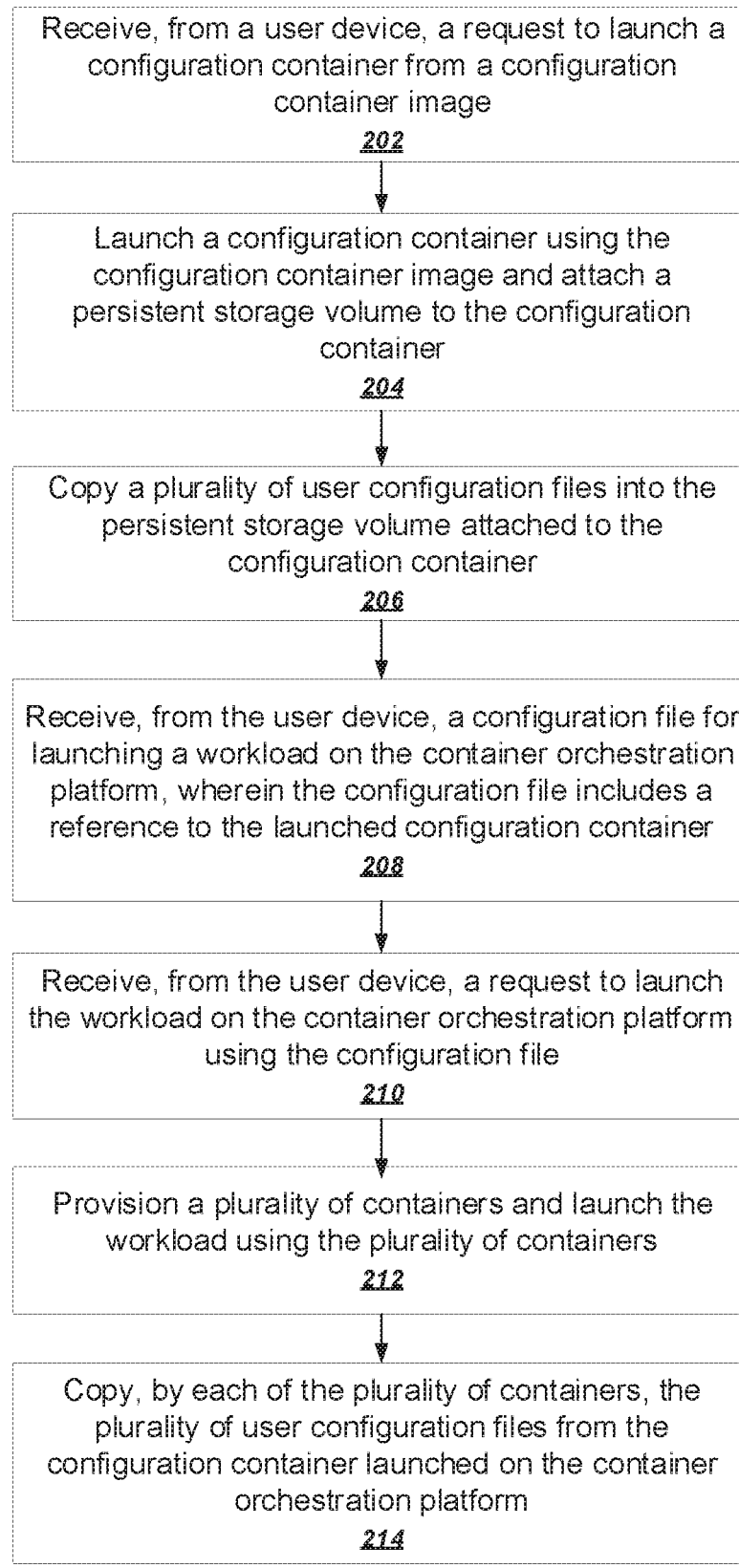
FIG. 2 is a flowchart of an example process for performing container configuration using a configuration container.

FIG. 2 is a flowchart of an example process for performing container configuration using a configuration container. For convenience, the process will be described as being performed by a system of one or more computers and programmed appropriately in accordance with this specification. For example, the cloud computing platform 120 in the system 100 of FIG. 1, appropriately programmed can perform the example process.

The system receives, from a user device, a request to launch a configuration container from a configuration container image (202). The system receives the request during a preparation stage before the user device sends out an actual request to launch a workload.

The system launches a configuration container using a configuration container image and attaches a persistent storage volume to the configuration container (204). The system can later use the persistent storage volume to store user-specific configuration files obtained from the user device. After the configuration container is launched, the user device obtains, from the system, a reference to the launched configuration container. The user device can later include the reference to the launched configuration container in a configuration file for launching a workload.

The persistent storage volume is a data storage device that can retain data after that device is shut off or is restarted. The persistent storage volume can store user-specific configuration files and avoid recopying these configuration files from the user device. The user-specific configuration files can remain available to any workload container that needs to be set up. The system can separate computation resources and storage resources by using a persistent storage volume attached to a configuration container. The system can allow a user device to delete the computation resources when a job is done, but not necessarily delete the user-specific configuration files of a workload that performs the job.

The system copies a plurality of user-specific configuration files into the persistent storage volume attached to the configuration container (206). The system does not have a size limit to the user-specific configuration files and the files can be either ASCII or binary. The system can share the same user-specific configuration files across many containers requested by the same user device by storing the user-specific configuration files in the persistent storage volume attached to the configuration container.

The system receives, from the user device, a configuration file for launching a workload on the container orchestration platform, wherein the configuration file includes a reference to the launched configuration container (208). The system can receive a configuration file for launching different types of workloads, such as database workloads, web communication workloads, and GPU computation workloads. For example, the configuration file for launching a Greenplum database workload instance can be a Greenplum Instance yaml configuration file. The configuration file can contain necessary workload configuration information and a reference to a launched configuration container. In some implementations, the configuration file can include configuration parameters for other specialized data processing and computation. For example, the configuration file for launching a Greenplum Instance can include configuration parameters for text data processing, and configuration parameters for parallel high throughput data access and query processing.

The system receives, from the user device, a request to launch the workload on the container orchestration platform using the configuration file (210). This system forwards the request to a container orchestration platform. For example, the system can receive a request to launch one or more virtual machines, micro services, Kubernetes services, or other platform services, etc., on the container orchestration platform using the configuration file. An API server, e.g., a Kubernetes API server, can interpret the content of the configuration file.

In some implementations, the API server can previously define a custom resource that is not necessarily available in a default Kubernetes installation, and then the API server can use the previously defined custom resource to accept a configuration file for the custom resource.

In some implementations, the API server then can validate the configuration file and can determine that the content of the configuration file is valid. Then the API server can store the configuration file in its backing storage, e.g., an etcd. In some implementations, the API server can store the configuration file in the persistent storage volume 124.

In some implementations, after storing the validated configuration file, the API server can notify at least one connected client that has an active "watch" configured with a particular identity, e.g., an API group, a version, a kind, a namespace, a name, etc. A controller, e.g., a Greenplum Operator, can be actively connected to the API server and can establish the active "watch". In some implementations, the controller can be a built-in controller running within a controller-manager component of Kubernetes. The controller can receive a notification that includes changes to the objects that the controller is configured to react to. The notification can include the content of the new or updated configuration. In some implementations, if a controller does not have an active connection to the API server, the controller can connect or reconnect to the API server. The controller can retrieve the full list of objects it needs, and can ensure the resources it manages are in the state specified by those objects.

The system provisions a plurality of containers and launches the workload using the plurality of containers (212). The system also provides the plurality of containers reference information to the launched configuration container. For example, each of the plurality of containers can, from the yaml configuration file, get a directory information that can be used to reference the launched configuration container.

The system copies the plurality of user-specific configuration files from the configuration container launched on the container orchestration platform to each of the plurality of containers (214). This allows any number of containers to use the same configuration container and allows the plurality of containers to remain stateless. Each of the plurality of containers can access the configuration container using the reference information to the configuration container. Then each of the plurality of containers can obtain the same copy of shared user-specific configuration files stored in the persistent storage volume attached to the configuration container.

The system can properly configure each of the plurality of containers according to the copied user-specific configuration files. In this way, the system does not need to modify the images of each of the plurality of containers and the system does not need to add persistent storage volume to each of the plurality of containers.

In some implementations, when the workload is finished, the system can release the plurality of containers and the system can keep the configuration container and the persistent storage volume attached to the configuration container unchanged. The configuration container can be used when the system needs to launch other workloads in the future.

In some implementations, a user may need to restart a workload with a set of user configuration files. The system can receive, from the user device, a configuration file for restarting a workload on the container orchestration platform. The configuration file can include a reference to a launched configuration container. The system can receive, from the user device, a request to restart the workload on the container orchestration platform using the configuration file. The system can provision a plurality of containers and restart the workload using the plurality of containers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by a container orchestration platform comprising a plurality of computers, the method comprising:
   receiving, from a user device, a request to launch a configuration container from a configuration container image;
   launching a configuration container using the configuration container image and attaching a persistent storage volume to the configuration container;
   copying a plurality of user configuration files into the persistent storage volume attached to the configuration container;
   receiving, from the user device, a configuration file for launching a workload on the container orchestration platform, wherein the configuration file includes a reference to the launched configuration container;
   receiving, from the user device, a request to launch the workload on the container orchestration platform using the configuration file;
   provisioning a plurality of containers and launching the workload using the plurality of containers; and
   copying, by each of the plurality of containers, the plurality of user configuration files from the configuration container launched on the container orchestration platform.

2. The method of claim 1, further comprising:
   receiving, from the user device, a configuration file for restarting a workload on the container orchestration platform, wherein the configuration file includes a reference to the launched configuration container;

receiving, from the user device, a request to restart the workload on the container orchestration platform using the configuration file; and provisioning a plurality of containers and restarting the workload using the plurality of containers.

3. The method of claim 1, wherein the container orchestration platform comprises an application programming interface (API) server and a controller, and the method comprises:

receiving by the API server, from the user device, a request to launch the workload on the container orchestration platform using the configuration file;

forwarding by the API server, the request to launch the workload, to the controller;

provisioning by the controller, a plurality of containers and launching by the controller, the workload using the plurality of containers; and performing by each of the plurality of containers, configuration using the plurality of user configuration files copied from the configuration container.

4. The method of claim 1, wherein the container orchestration platform further comprises a mediator software application, and the method comprises:

copying, by the mediator software application, the plurality of user configuration files from the configuration container to each of the plurality of containers.

5. The method of claim 1, wherein copying, by each of the plurality of containers, the plurality of user configuration files from the configuration container launched on the container orchestration platform comprises executing a copying operation following one or more protocols provided by the configuration container.

6. The method of claim 1, further comprising:

launching a plurality of copies of the configuration container;

copying, by some of the plurality of containers, the plurality of user configuration files from one or more of the plurality of copies of the configuration container; and copying, by the other of the plurality of containers, the plurality of user configuration files from the rest of the plurality of copies of the configuration container.

7. The method of claim 1, further comprising:

performing, by each of the plurality of containers, configuration using the plurality of user configuration files copied from the configuration container.

8. The method of claim 1, further comprising:

when the workload is finished, releasing the plurality of containers; and keeping the configuration container and the persistent storage volume attached to the configuration container unchanged.

9. A computing system comprising a plurality of computers and one or more storage devices storing instructions that are operable, when executed by the plurality of computers, to cause the plurality of computers perform operations comprising:

receiving, from a user device, a request to launch a configuration container from a configuration container image;

launching a configuration container using the configuration container image and attaching a persistent storage volume to the configuration container;

copying a plurality of user configuration files into the persistent storage volume attached to the configuration container;

receiving, from the user device, a configuration file for launching a workload on a container orchestration platform, wherein the configuration file includes a reference to the launched configuration container;

receiving, from the user device, a request to launch the workload on the container orchestration platform using the configuration file;

provisioning a plurality of containers and launching the workload using the plurality of containers; and copying, by each of the plurality of containers, the plurality of user configuration files from the configuration container launched on the container orchestration platform.

10. The system of claim 9, wherein the operations further comprise:

receiving, from the user device, a configuration file for restarting a workload on the container orchestration platform, wherein the configuration file includes a reference to the launched configuration container;

receiving, from the user device, a request to restart the workload on the container orchestration platform using the configuration file; and provisioning a plurality of containers and restarting the workload using the plurality of containers.

11. The system of claim 9, wherein the container orchestration platform comprises an application programming interface (API) server and a controller, and wherein the operations further comprise:

receiving by the API server, from the user device, a request to launch the workload on the container orchestration platform using the configuration file;

forwarding by the API server, the request to launch the workload, to the controller;

provisioning by the controller, a plurality of containers and launching by the controller, the workload using the plurality of containers; and performing by each of the plurality of containers, configuration using the plurality of user configuration files copied from the configuration container.

12. The system of claim 9, wherein the container orchestration platform further comprises a mediator software application, and wherein the operations further comprise:

copying, by the mediator software application, the plurality of user configuration files from the configuration container to each of the plurality of containers.

13. The system of claim 9, wherein copying, by each of the plurality of containers, the plurality of user configuration files from the configuration container launched on the container orchestration platform comprises executing a copying operation following one or more protocols provided by the configuration container.

14. The system of claim 9, wherein the operations further comprise:

launching a plurality of copies of the configuration container;

copying, by some of the plurality of containers, the plurality of user configuration files from one or more of the plurality of copies of the configuration container; and copying, by the other of the plurality of containers, the plurality of user configuration files from the rest of the plurality of copies of the configuration container.

15. The system of claim 9, wherein the operations further comprise:

performing, by each of the plurality of containers, configuration using the plurality of user configuration files copied from the configuration container.

16. The system of claim 9, wherein the operations further comprise:
   when the workload is finished, releasing the plurality of containers; and
   keeping the configuration container and the persistent storage volume attached to the configuration container unchanged.

17. One or more non-transitory computer storage media encoded with computer program instructions that when executed by a distributed system comprising a plurality of computers cause the plurality of computers to perform operations comprising:
   receiving, from a user device, a request to launch a configuration container from a configuration container image;
   launching a configuration container using the configuration container image and attaching a persistent storage volume to the configuration container;
   copying a plurality of user configuration files into the persistent storage volume attached to the configuration container;
   receiving, from the user device, a configuration file for launching a workload on a container orchestration platform, wherein the configuration file includes a reference to the launched configuration container;
   receiving, from the user device, a request to launch the workload on the container orchestration platform using the configuration file;
   provisioning a plurality of containers and launching the workload using the plurality of containers; and
   copying, by each of the plurality of containers, the plurality of user configuration files from the configuration container launched on the container orchestration platform.

18. The computer storage media of claim 17, wherein the operations further comprise:
   receiving, from the user device, a configuration file for restarting a workload on the container orchestration platform, wherein the configuration file includes a reference to the launched configuration container;
   receiving, from the user device, a request to restart the workload on the container orchestration platform using the configuration file; and
   provisioning a plurality of containers and restarting the workload using the plurality of containers.

19. The computer storage media of claim 17, wherein the container orchestration platform comprises an application programming interface (API) server and a controller, and wherein the operations further comprise:
   receiving by the API server, from the user device, a request to launch the workload on the container orchestration platform using the configuration file;
   forwarding by the API server, the request to launch the workload, to the controller;
   provisioning by the controller, a plurality of containers and launching by the controller, the workload using the plurality of containers; and
   performing by each of the plurality of containers, configuration using the plurality of user configuration files copied from the configuration container.

20. The computer storage media of claim 17, wherein the container orchestration platform further comprises a mediator software application, and wherein the operations further comprise:
   copying, by the mediator software application, the plurality of user configuration files from the configuration container to each of the plurality of containers.

* * * * *